(12) United States Patent
Ogino et al.

(10) Patent No.: US 7,545,343 B2
(45) Date of Patent: Jun. 9, 2009

(54) DISPLAY DEVICE

(75) Inventors: Akihisa Ogino, Nara (JP); Sadahiko Yasukawa, Yamatokooriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 815 days.

(21) Appl. No.: 11/044,706

(22) Filed: Jan. 28, 2005

(65) Prior Publication Data
US 2005/0184971 A1 Aug. 25, 2005

(30) Foreign Application Priority Data
Jan. 28, 2004 (JP) .............................. 2004-020595
Dec. 24, 2004 (JP) .............................. 2004-375077

(51) Int. Cl.
*G09G 3/00* (2006.01)
(52) U.S. Cl. ........................ 345/30; 345/104; 345/173; 345/174
(58) Field of Classification Search ................ 345/30, 345/104, 173–174
See application file for complete search history.

(56) References Cited
FOREIGN PATENT DOCUMENTS

| JP | 2-205823 A | 8/1990 |
|---|---|---|
| JP | 5-313130 | * 11/1993 |
| JP | 7-20623 U | 4/1995 |
| JP | 11-133424 A | 5/1999 |
| JP | 2004-184885 A | 7/2004 |

* cited by examiner

*Primary Examiner*—Richard Hjerpe
*Assistant Examiner*—Leonid Shapiro
(74) *Attorney, Agent, or Firm*—Nixon & Vanderhye P.C.

(57) ABSTRACT

A display device is equipped with a panel having a common electrode layer to which a voltage changing at a fixed frequency is applied and a tabular member which is arranged at a fixed gap from said panel. A voltage which is changed in synchronization with the change of a voltage which is applied to the common electrode layer is applied, and an electrode layer which is arranged so as to be nearly parallel to the fore-mentioned tabular member and the fore-mentioned panel is provided.

6 Claims, 14 Drawing Sheets fig.3  (a)  (b)  (c)

fig.8 (a) (b) (c)

DISPLAY DEVICE

BACKGROUND OF THE INVENTION

1. Field of the Invention

The present invention relates to a display device, and more specifically, relates to a display device in which a liquid crystal panel faces a touch panel, a protective panel, a front light unit, a back light unit and the like at a fixed gap.

2. Description of the Related Art

In a liquid crystal display device carrying out a line inversion drive, for example, a display device in which a touch panel was provided on the display side of a liquid crystal panel has had a problem that sound generation providing uncomfortable feeling was generated. The present inventors have marked the problem, have extensively studied it and as a result, considered that its cause is originated as below. Namely, it is considered that the surface (the surface of a polarized plate) of a liquid crystal panel and the rear face of a touch panel which faces the liquid crystal panel are charged by any reason and they are oscillated by electric field generated by the liquid crystal panel to cause the problem.

Its principle is specifically illustrated referring to the following drawings. For example, the arbitrary point a of the rear face of the touch panel 1 as shown in FIG. 14 and the point b of the surface of the liquid crystal panel 2 which faces the point a are marked, and when electric charge which is charged at the point a of the touch panel 1 is referred to as qa and electric charge which is charged at the point b of the panel 2 is referred to as qb, forces Fa and Fb which are respectively applied to these electric charges qa and qb are determined by the following formulae (further, components only to the lamination direction of the liquid crystal panel and the touch panel as the components of the forces (and the components of the electric fields) are considered).

$$Fa = qa \times Ea$$

$$Fb = qb \times Eb$$

Further, Ea is electric field strength at the point a and Eb is the electric field strength at the point b.

Herein, the electric field strength Ea at the point a is determined by the following formula. (Further, the electric field strength has electric field components caused by signals applied to a pair of the electrode layers of the touch panel and the pixel electrode layers of the liquid crystal panel or segment electrodes, but since they are almost a case that they are not variations at a constant frequency which becomes the cause of the sound generation, they are daringly abbreviated hereat.)

$$Ea = Ecoma(t) + Eqa + Eqb$$

Furthermore, Ecoma(t) is caused by the drive of the liquid crystal panel (counter electrode layer) among the electric field components at the point a and is a function of time, Eqa is caused by the electric charge qa among the electric field components at the point a, and Eqb is caused by the electric charge qb among the electric field components at the point b.

Herein, Ecoma(t) is electric field which is generated by the counter electrode signals (hereinafter, referred to as CMOS signals) applied to the counter electrode layer. Since a voltage is changed at a constant frequency, the value of Ea is not constant and the CMOS signals are changed by drive frequency components. Accordingly, Fa is also changed by the fore-mentioned drive frequency. With respect to this, the force Fb which liberates the point b of the panel is also similar.

Further, considering the whole rear face of the touch panel, the total quantity of charge at the rear face of the touch panel is referred to as Qtp and the Qtp, namely Ftp which acts on the whole rear face of the touch panel is considered to be similarly changed. Similarly, when the total charge quantity of the whole surface of the panel is referred to as Q1c, F1c which acts on the whole surface of the panel is considered to be also changed.

Namely, when Ea and Eb are constant, the vibrations of the panel and the touch panel are not generated because the force acting on the Qtp and Q1c is constant, but since Ea and Eb are changed by the drive frequency which is a constant frequency as mentioned above, the surface of the panel or the rear face of the touch panel is vibrated by the same frequency as the drive frequency, it is considered that a space between the panel and the touch panel is vibrated to generate the sound generation.

The following methods are considered as a method of lowering and reducing such sound generation.

Firstly, there is a method of heightening or lowering the drive frequency of a liquid crystal panel which is a cause of the sound generation and excluding it from a range of audible frequency by a human or hardly hearing it. However, when the drive frequency is heightened, it causes the increase of power consumption and when drive frequency is raised in case of a liquid crystal display device, a charging time to a liquid crystal is shortened, therefore there occur problems that contrast is lowered because of the insufficiency of charging, cross stroke is generated and the like. Further, when the drive frequency is lowered, a problem of generating a flicker exists.

Furthermore, there is also considered a method of preventing the occurrence of the change of Coulomb's force at a panel face by making drive signals as DC drive. However, since the output voltage of a source is heightened in order to make the drive signals as the DC drive, a high voltage resistant article is required to be used as a source driver and there occurs a problem that power consumption is increased thereby.

Furthermore, there is also considered a method of removing an aerial layer between a liquid crystal panel and a touch panel by closely bonding the rear face of the touch panel on the surface of a liquid crystal panel with paste or the like and eliminating the vibration of the aerial layer to prevent the sound generation. However, when the touch panel and the like are directly bonded on the surface of the panel, there are the problem of display quality caused by peeling at an adhesive face and a problem that the bonding work is difficult.

Further, there is also considered a method of suppressing the charging at the surface of a liquid crystal panel and the rear face of a touch panel as low as possible and preventing the generation of vibration caused by Coulomb's force. However, it is required to carry out discharge working while carrying out the management of charging quantity by a discharge blower and the like in order to prevent the charging. There are problems of the lowering of productivity spent for the discharge working and the investment of a facility for managing the charging quantity.

Furthermore, there is also considered a method of suppressing the generation of vibration by separating a distance between a liquid crystal panel and a touch panel facing it and lowering the Coulomb's force, or a method of lowering the level of not hearing the sound generation caused by the vibration of air even if it is vibrated. However, there is a problem that a dimension to the lamination direction of a display device must be enlarged for thus separating the distance.

Further, a method disclosed in Japanese Patent Utility Model Publication (Unexamined) No. 7-20623 is known as a method of solving influence on the precision of positional detection by noise around a touch panel (a resistance membrane tablet device). It is disclosed in this patent literature 1 that a transparent electrode layer is formed on the surface of a touch panel and the transparent electrode layer is grounded. Further, since the charging is suppressed at the rear face of a touch panel (a face on which a transparent electrode layer was formed) in the method described in the fore-mentioned preceding literature, it is also considered that it is effective for the sound generation caused by the vibration of the rear face of a touch panel. However, when other member is additionally added on the rear face of the transparent electrode layer, it is considered that the sound generation as previously described is generated by the charging with such member.

The present invention was carried out considering the above-mentioned problems of a conventional technology, and the subject of the present invention is to prevent the sound generation generated in a display device equipped with a panel having a common electrode layer to which a voltage changing at a fixed frequency is applied like the liquid crystal panel and a tabular member which is arranged at a fixed gap from said panel.

SUMMARY OF THE INVENTION

The present invention was carried out for solving the above-mentioned problems. The display device related to the present invention is equipped with a panel having a common electrode layer to which a voltage changing at a fixed frequency is applied and a tabular member which is arranged at a fixed gap from said panel and has a characteristic in the point of adopting the means below.

Namely, the display device related to the present invention is characterized in that a voltage which is changed in synchronization with the change of a voltage which is applied to the fore-mentioned common electrode layer is applied and an electrode layer which is arranged so as to be in nearly parallel to the fore-mentioned tabular member and the fore-mentioned panel is provided.

Electric field which is generated based on the common electrode layer of the panel can be cancelled by the electric field which is generated by the fore-mentioned electrode layer, by adopting said composition. Namely, although the electric field which is generated based on the common electrode layer of the panel is periodical, the fore-mentioned electric field can be cancelled by applying a voltage which is changed in synchronization with the change of a voltage which is applied to the fore-mentioned common electrode layer. Accordingly, for example, even when the faces of the tabular member and the panel which are opposed respectively are charged, the Coulomb's force of the faces of the tabular member and the panel which were charged can be suppressed; therefore the vibration of the panel and the tabular member can be suppressed and the phenomenon of the sound generation can be evaded.

The "voltage which is changed in synchronization" with the change of a voltage which is applied to the fore-mentioned electrode layer can be, for example, a voltage which is changed at the same phase or reverse phase and the same frequency as the frequency of the change of a voltage which is applied to the common electrode layer, and additionally, for example, a voltage which is changed at an integer-fold of the frequency of the change of a voltage which is applied to the common electrode layer.

The above-mentioned display device related to the present invention adopts preferably a composition that when the tabular member is arranged between the fore-mentioned electrode layer and the fore-mentioned common electrode layer, a voltage having the same phase as the change of a voltage applied to the fore-mentioned common electrode layer is applied to said electrode layer.

Thereby, the electric field which is generated based on the voltage applied to the common electrode layer contradicts mutually the electric field which is generated based on the voltage applied to the fore-mentioned electrode layer in the tabular member.

Further, when the above-mentioned composition was applied, it is preferably further equipped with a common electrode signal-generating circuit for applying a voltage to the common electrode layer and the fore-mentioned electrode layer.

Thereby, the fore-mentioned desired voltage can be applied to the common electrode layer and the electrode layer by one common electrode signal-generating circuit. Further, even if the above-mentioned composition was applied, there can be adopted, for example, a composition that it is further equipped with a sound generation improving signal-generating circuit which carries out a fixed processing to a voltage which the fore-mentioned common electrode signal-generating circuit generated, preparing sound generation improving signals and applying said sound generation improving signals to the fore-mentioned electrode layer.

Furthermore, the display device related to the above-mentioned present invention can adopt a composition that the voltage changed at a fixed frequency is applied to the fore-mentioned common electrode layer and the voltage applied to the electrode layer is changed at a higher frequency than a frequency which the voltage applied to the fore-mentioned common electrode signals has.

Further, when the above-mentioned composition was applied, it is preferable to adopt a composition that it is further equipped with a common electrode signal-generating circuit for generating a voltage applied to the fore-mentioned common electrode layer and the fore-mentioned electrode layer and a sound generation improving signal-generating circuit which carries out a fixed processing to a voltage which the fore-mentioned common electrode signal-generating circuit generated, preparing sound generation improving signals and applying said sound generation improving signals to the fore-mentioned electrode layer.

Furthermore, the display device related to the present invention is characterized in that an electrode layer which is arranged so as to be in nearly parallel to the fore-mentioned tabular member and the fore-mentioned panel is provided and a voltage generating electric field which changes the cycle of changing the electric field which is generated by applying a voltage changing at a fixed frequency to the fore-mentioned common electrode layer is applied to the fore-mentioned electrode layer.

When said composition is applied, the cycle of the change of electric field which is generated based on the voltage which is applied to the common electrode layer of the panel can be changed by electric field which is generated based on the voltage which is applied to the electrode layer; therefore even when the tabular member and the panel are charged, the present situation of the sound generation can be evaded by controlling vibration caused by the Coulomb's force acting on the tabular member and the panel, or by setting the cycle of vibration caused by the Coulomb's force acting on the tabular member and the panel out of the range of an audible zone.

It is illustrated below mentioning a specific example. For example, when a voltage having a cycle of 10 kHz is applied to the common electrode layer and the electrode layer of the present invention does not exist, the electric field by the common electrode is oscillated at the cycle of 10 kHz. However, even if the panel and the like charged and the like are vibrated by the Coulomb's force based on the electric field, the cycle is set out of the range of an audible zone by applying a voltage of 30 kHz to the electrode layer of the present invention and oscillating electric field caused by the common electrode layer and the electrode layer at the cycle of 30 kHz; therefore it can be set so as not to be recognized by a person.

Furthermore, the display device related to the above-mentioned present invention is preferably further equipped with a common electrode signal-generating circuit for generating a voltage applied to the fore-mentioned common electrode layer and the fore-mentioned electrode layer and a sound generation improving signal-generating circuit which carries out a fixed processing to a voltage which the fore-mentioned common electrode signal-generating circuit generated, preparing sound generation improving signals and applying said sound generation improving signals to the fore-mentioned electrode layer.

Thereby, the fore-mentioned desired voltage can be applied to the common electrode layer by the common electrode signal-generating circuit, the voltage which was generated by said common electrode layer is processed with a fixed processing to prepare sound generation improving signals, and the fore-mentioned desired voltage can be applied to the fore-mentioned electrode layer by the sound generation improving signals.

Furthermore, in the display device related to the present invention, the tabular member which is arranged at a fixed gap between the panel includes various members such as a member composing a touch panel, a protective plate which is arranged on the display face side of the panel, a member composing a backlight, a member composing a front light and an optical sheet. Further, the electrode layer to which a desired voltage is applied can be realized by forming by lamination on the tabular member or the display face of the panel or the rear face (a face in an opposite side of the display face). Furthermore, said electrode layer can be provided in the inside of a structural body (for example, touch panel) which is composed by laminating other member on the tabular member. Further, said electrode layer can be also formed in the inside of the panel. Further, said electrode layer can be composed by an electrode sheet which was arranged at any position in the display device related to the present invention. Further, a conventional electrode layer (for example, the electrode layer of a touch panel) can be also utilized as said electrode layer.

Further, the display device related to the present invention can be preferably used for those in which the tabular member is arranged at a fixed gap from the fore-mentioned panel at the display face side of the fore-mentioned panel. Namely, when the sound generation described already is generated on the display face side of the panel, it imparts remarkably bad feeling to a user in comparison with the case that the sound generation is generated on the rear face side.

Furthermore, the display device related to the present invention can adopt a composition that it is further equipped with a touch panel comprising the first electrode layer and the second electrode layer which is arranged so as to face said first electrode layer on the display face side of the fore-mentioned panel than said first electrode layer, wherein the fore-mentioned electrode layer to which a desired voltage for improving the sound generation is applied is at least one of the fore-mentioned first electrode layer and the fore-mentioned second electrode layer of the fore-mentioned touch panel.

Namely, the display device related to the present invention can be obtained by utilizing a conventional touch panel as it is by applying a desired voltage for improving the sound generation to the first electrode layer or the second electrode layer which the conventional touch panel has and only modifying the electrical control of the first electrode layer or the second electrode layer.

Further, when the above-mentioned composition is adopted, it is preferable to adopt a composition which is further equipped with a touch panel controller which detects electrical change generated between the fore-mentioned first electrode layer and the fore-mentioned second electrode layer by touching the fore-mentioned touch panel by a user and detects a position at which said user touched and a switch means which switches electrical connection between the fore-mentioned first electrode layer and/or the fore-mentioned second electrode layer and the fore-mentioned touch panel controller to a conducted condition and an intercepted condition.

Thereby, when a touch panel is used, the touch panel controller can detect the position at which a user touched by electrical change which is generated between the first electrode layer and the second electrode layer, by switching it to a condition in which the touch panel controller is electrically conducted to the fore-mentioned electrode layer.

Further, when the above-mentioned composition was adopted, it is preferable that the fore-mentioned switch means is provided so that it detects electrical change which is generated between the first electrode layer and the second electrode layer of the touch panel and electrical connection between the fore-mentioned first electrode layer and/or the fore-mentioned second electrode layer and the fore-mentioned touch panel controller is switched from an intercepted condition to a conducted condition.

Furthermore, when a composition equipped with the touch panel controller and the switch means is adopted as described above, it is preferable that a signal-generating circuit for applying the fore-mentioned desired voltage to the electrode layer comprising the fore-mentioned first electrode layer or the second electrode layer is further provided and the fore-mentioned switch means is provided so as to switch electrical connection between the fore-mentioned electrode layer and the fore-mentioned signal-generating circuit, to a conducted condition and an intercepted condition.

When the signal-generating circuit is provided, it is preferable that the fore-mentioned switch means is provided so that when it is switched to a conducted condition between the fore-mentioned electrode layer and the fore-mentioned touch panel controller, said electrode layer and the fore-mentioned signal-generating circuit are set to an intercepted condition. In particular, it is preferable that said switch means is provided so that it detects electrical change which is generated between the first electrode layer and the fore-mentioned second electrode layer of the fore-mentioned touch panel, the connection between the fore-mentioned electrode layer and the signal-generating circuit is set to an intercepted condition and said electrode layer and the touch panel controller are set to a conducted condition.

Further, when the above-mentioned signal-generating circuit is provided, it is preferable that the fore-mentioned switch means is provided so that when the connection between the fore-mentioned electrode layer and the fore-mentioned touch panel controller is set to an intercepted condition, said electrode layer and the fore-mentioned signal-generating circuit are set to a conducted condition. In particular, it is preferable that the fore-mentioned switch means is provided so that when electrical change which is generated between the first electrode layer and the fore-mentioned second electrode layer of the fore-mentioned touch panel is not detected for a fixed time, the connection between the fore-mentioned electrode layer and the touch panel controller is set to an intercepted condition and the fore-mentioned electrode layer and the signal-generating circuit are set to a conducted condition.

Further, the fore-mentioned electrode signal-generating circuit is a circuit for applying a voltage for improving the sound generation to the electrode layer, and when a voltage is directly applied from the common electrode signal-generating circuit for generating a voltage applied to the fore-mentioned common electrode layer to the fore-mentioned electrode layer, the common electrode signal-generating circuit comes under the fore-mentioned electrode signal circuit. When the sound generation improving signal-generating circuit which prepares the sound generation improving signals and applies the fore-mentioned sound generation improving signals to the fore-mentioned electrode layer is provided, said sound generation improving signal-generating circuit comes under the fore-mentioned electrode signal-generating circuit.

Further, when the display device related to the present invention is further equipped with a touch panel comprising the first electrode layer and the second electrode layer which is arranged so as to face said first electrode layer at the display face side of the fore-mentioned panel than the first electrode layer, the fore-mentioned electrode layer is preferably composed of a transparent electrode layer which was arranged between the fore-mentioned first electrode layer and the fore-mentioned common electrode layer.

Thereby, the display device related to the present invention can be obtained, for example, by laminating or arranging a transparent electrode layer on a panel and a touch panel which were conventionally used and applying a desired voltage to the transparent electrode layer. Furthermore, the electrode layer of a touch panel and the electrode layer of a panel can be controlled by a similar control method as a conventional device. Further, since the electrode layer is composed of the transparent electrode layer, it is not visually recognized from a user and good display can be carried out.

Further, the display device related to the present invention is further equipped with a touch panel comprising the second electrode layer which is arranged so as to face said first electrode layer at the display face side of the fore-mentioned panel, wherein the fore-mentioned electrode layer is composed of a transparent electrode layer which was arranged on the display face side of the touch panel than the first electrode layer and.

Thereby, for example, the display device related to the present invention can be obtained by forming a transparent electrode layer on the display face side of a touch panel which was conventionally used and applying a desired voltage to the transparent electrode layer. Further, the electrode layer of a touch panel and the electrode layer of a panel can be controlled by a similar control method as a conventional device. Furthermore, since the electrode layer is composed of a transparent electrode layer, it is not visually recognized from a user and good display can be carried out.

Further, when the tabular member is a surface panel which is arranged on the display face side of the panel, a composition in which the electrode layer is the transparent electrode layer which was provided at said surface panel can be adopted.

Thereby, since the electrode layer is composed of the transparent electrode layer, it is not visually recognized from a user and good display can be carried out. Furthermore, the fore-mentioned transparent electrode layer can be also formed on the display face and/or the rear face (a face in the opposite side of the display face side) of a surface panel, and can be also formed in the inside of the surface panel.

Further, as the fore-mentioned surface panel, for example, a protective panel for protecting the display face of the panel can be adopted.

Further, in the case that the display device related to the present invention is equipped with a front light, when the fore-mentioned tabular member is a portion of the member composing the front light which is arranged on the display face side of the fore-mentioned panel, a composition in which the fore-mentioned electrode layer is the transparent electrode layer which was provided at said front light is adopted; therefore the electrode layer is not visually recognized from a user and good display can be carried out.

Furthermore, the fore-mentioned transparent electrode layer can be also formed on the display face and/or the rear face of the member composing the front light, and can be also formed in the inside of the member composing the front light.

Further, in the case that the display device related to the present invention is equipped with a back light, when the tabular member is a portion of the member composing the back light which is arranged on the rear face (a face on the opposite side of the display face side) of the panel, a composition in which the fore-mentioned electrode layer is the transparent electrode layer which was provided on the rear face side of the panel is adopted; therefore the electrode layer is not visually recognized from a user and good display can be carried out.

Furthermore, when the above-mentioned composition is adopted, there can be adopted a composition in which the panel comprises the first transparent substrate and the second transparent substrate which is arranged on the display face side than said first transparent substrate, the fore-mentioned transparent electrode layer is formed on the opposite side of the display face of said first transparent substrate, and a polarizing plate is bonded on the opposite side of the display face of said transparent electrode layer.

DESCRIPTION OF THE PREFERRED EMBODIMENTS

Example 1

The liquid crystal display device of Example 1 arranges a touch panel 1 at a fixed gap on the surface (a face on the display face side) of a liquid crystal panel 2.

Figure 1:
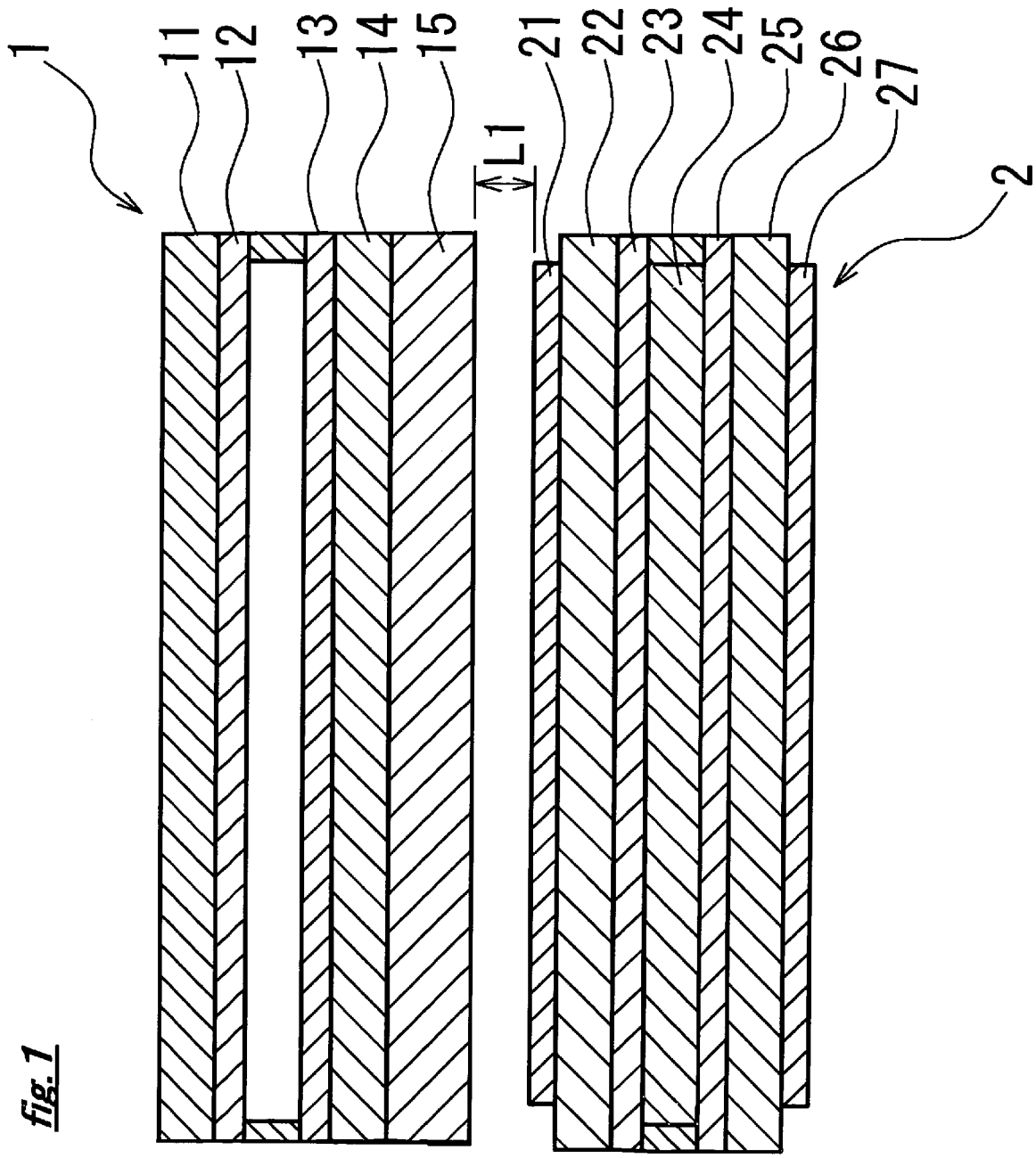
FIG. 1 shows a schematic sectional view of the liquid crystal display device of Example 1.
Figure 2:
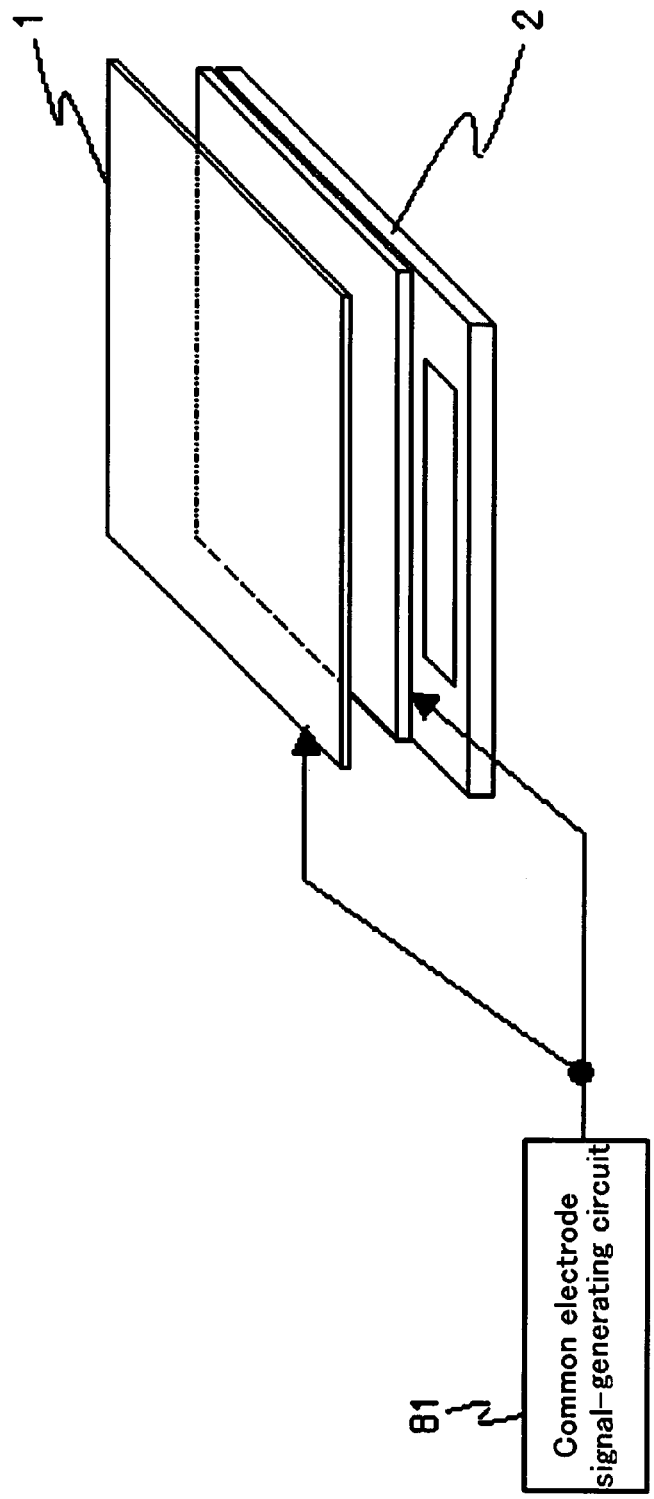
FIG. 2 is a schematic cross-eyed view for schematically illustrating the liquid crystal display device of Example 1.

As the liquid crystal panel 2 of the present Example, a liquid crystal panel which is similar as a conventionally known one is used. Namely, as shown in FIG. 1, said liquid crystal panel 2 comprises the first transparent substrate 26 and the second transparent substrate 22 which is arranged on the display face side than said first transparent substrate 26, and a liquid crystal 24 is sealed between a pair of the transparent substrates 22 and 26. Further, the fore-mentioned first transparent substrate 26 is occasionally referred to as the "rear face side substrate" and the fore-mentioned second transparent substrate 22 is occasionally referred to as the "surface side substrate".

The electrode layers 23 and 25 (a pixel electrode layer and a counter electrode layer (a common electrode layer)) are respectively formed by lamination on the fore-mentioned surface side substrate 22 and the rear face side substrate 26. Further, said liquid crystal panel 2 is equipped with polarizing plates 21 and 27 which are respectively bonded with the surface (a face on the display face side) of the surface side substrate 22 and the rear face (a face on the opposite side of the display face) of the rear face side substrate 22. Further, common electrode signals which change a voltage at a fixed frequency are applied to the fore-mentioned counter electrode layer 23. Furthermore, the liquid crystal panel 2 of the present Example is equipped with a common electrode signal-generating circuit 81 for applying the common electrode signals to said counter electrode layer 23 (refer to FIG. 4).

Further, the touch panel 1 of the present Example uses a touch panel having a similar structure as a conventionally known one. Namely, as shown in FIG. 1, said touch panel 1 comprises the first sheet material 14, the first electrode layer 13 which was formed by lamination on the surface of the first sheet material 14, the second electrode layer which was arranged so as to face the first electrode layer 13 at a fixed gap and the second sheet material 11 on whose rear face the second electrode layer is formed by lamination. Further, the fore-mentioned first sheet material 14 is occasionally referred to as the "rear face side sheet material", the first electrode layer 13 as the "rear face side electrode layer", the second electrode layer 12 as the "surface side electrode layer" and the fore-mentioned second sheet material 11 as the "surface side substrate".

At least the surface side sheet material 11 among the fore-mentioned sheet materials 11 and 14 is composed of a member having flexibility. When a user touches the touch panel 1, the surface side sheet material 11 is bent to the rear face side and the first electrode layer 12 and the second electrode layer 13 are provided so as to be mutually brought in contact at the portion where the user touched. Further, the touch panel 1 is equipped with a transparent layer 15 which was arranged at the rear face of the rear face side sheet material 14. Namely, in the present Example, the polarizing plate 21 on the surface side of the fore-mentioned liquid crystal panel 2 is arranged so as to face the transparent member 15 of the touch panel 1 at a fixed gap. The display device of the present Example is equipped with a touch panel controller 82 which detects electrical change generated between the fore-mentioned first electrode layer 12 and the fore-mentioned second electrode layer 13 by touching the fore-mentioned touch panel 1 by a user and detects a position at which said user touched (refer to FIG. 4).

Figure 3:
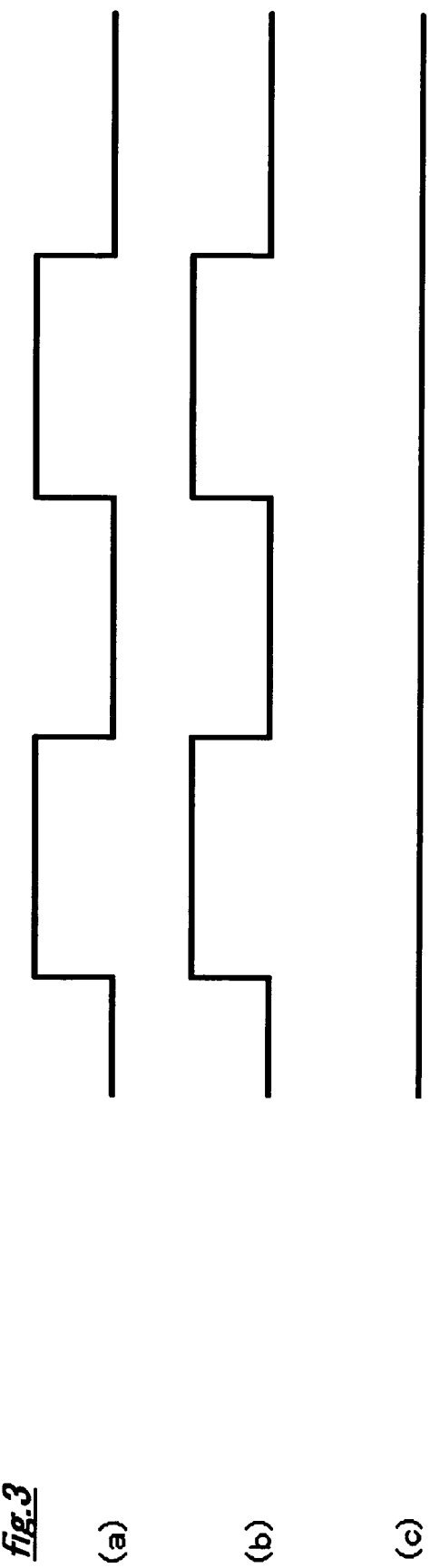
FIG. 3 is a schematic illustration diagram for illustrating relation between voltages applied to respective electrode layers and electrical field at a tabular member in the liquid crystal display device of Example 1, (a) shows relation between the voltage (longitudinal axis) applied to the counter electrode layer (common electrode layer) of the liquid crystal panel and a time (horizontal axis), (b) shows relation between the voltage (longitudinal axis) applied to the rear face side electrode layer of the touch panel and a time (horizontal axis), and (c) shows relation between the electric field (longitudinal axis) in the tabular member and a time (horizontal axis).

The display device of the present Example is provided so that a voltage which is changed in synchronization with the change of the voltage of common electrode signals can be applied to the rear face side electrode layer 13 of the touch panel 1. Herein, a voltage which is changed as described above is applied to said rear face side electrode layer 13 by the fore-mentioned common electrode signal-generating circuit 81, and therefore, the voltage applied to the rear face side electrode layer 13 is the same phase as the change of the voltage of common electrode signals and a voltage having the same voltage level as the voltage of the common electrode signals (refer to FIG. 3). Further, in the present invention, a desired voltage for suppressing the above-mentioned sound generation can be added to the surface side electrode layer 12, and further, the desired voltage can be applied to both of the surface side electrode layer 12 and the rear face side electrode layer 13.

Figure 4:
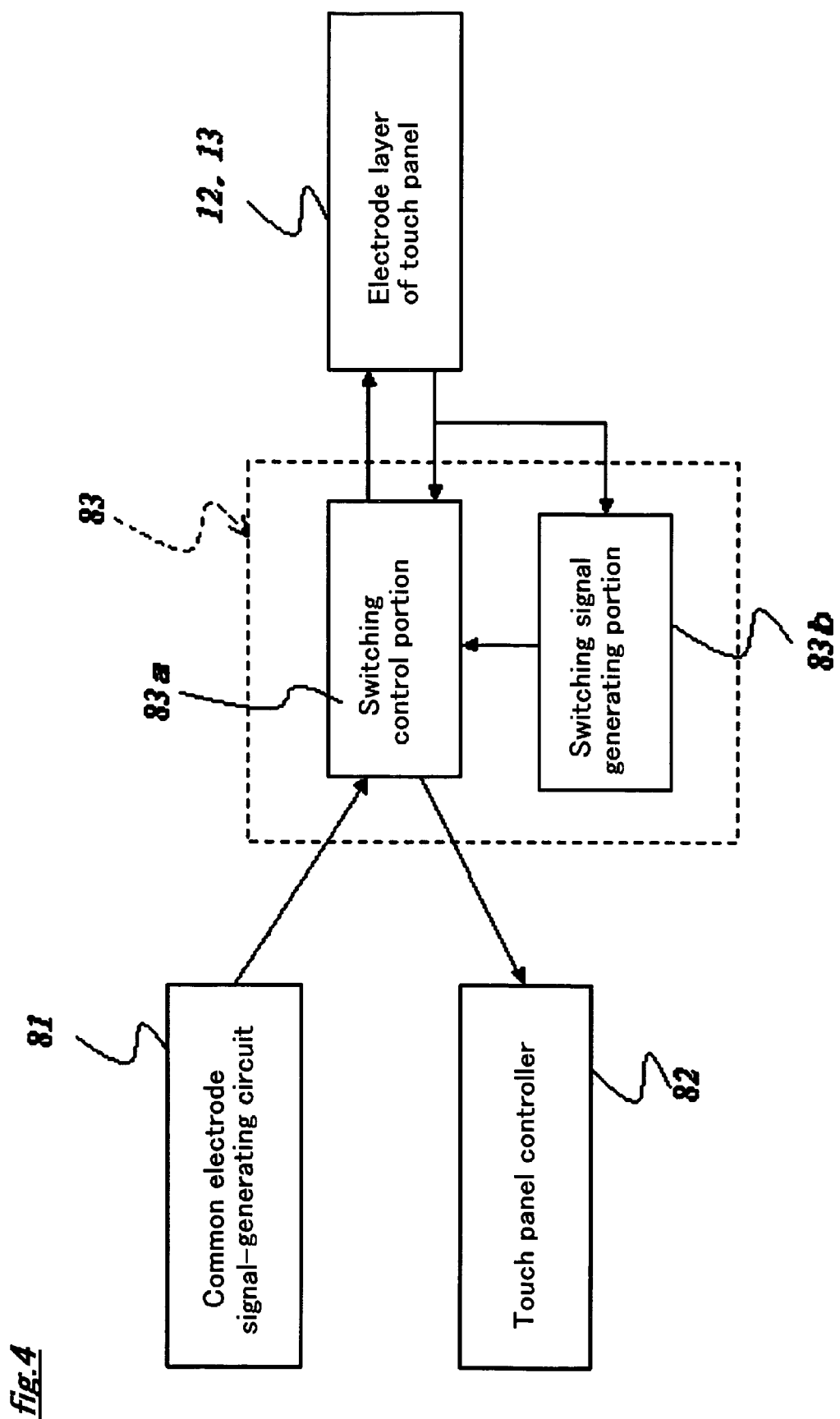
FIG. 4 is a schematic block diagram comprising a switching means in the liquid crystal display device of Example 1.

Furthermore, the display device of the present Example is equipped with a switch means 83 which switches the electrical connection condition of the rear face side electrode layer 13 to which the fore-mentioned desired voltage is applied, to a conducted condition with the fore-mentioned common electrode signal-generating circuit 81 and a conducted condition with the touch panel controller 82 (refer to FIG. 4).

The switch means 83 is equipped with a switching signal-generating portion 83a which detects input signals (electrical change generated between the first electrode layer 12 and the second electrode layer 13 of the touch panel 1) and prepares switching signals and a switching control portion 83b which switches the conducted condition of the common electrode signal-generating circuit 81 with the rear face side electrode layer 13 to the intercepted condition, based on the switching signals which said switching signal-generating portion 83a prepared, and switches to the conducted condition of the touch panel controller 82 with the rear face side electrode layer 13. Further, when the input signals of the touch panel 1 are not detected for a fixed time, the fore-mentioned switching signal-generating portion 83a is provided so as to prepare switching signals and send them to the fore-mentioned switching control portion 83b, and the switching control portion 83b which receives the switching signals is provided so that the conducted condition of the touch panel controller 82 with the rear face side electrode layer 13 is switched to the intercepted condition and switched to the conducted condition of the common electrode signal-generating circuit 81 with the rear face side electrode layer 13.

Namely, based on the presence or absence of the input signals of the touch panel 1, the switch means 83 is provided for switching the common electrode signal-generating circuit 81 and the rear face side electrode layer 13 to the intercepted condition and the touch panel controller 82 and the rear face side electrode layer 13 to the conducted condition when the input signals are inputted (when the touch panel 1 is used), and on the other hand, switching the touch panel controller 82 and the rear face side electrode layer 13 to the intercepted condition and the common electrode signal-generating circuit 81 and the rear face side electrode layer 13 to the conducted condition when the input signals are not inputted (when the touch panel is not used).

Further, the fore-mentioned switching signal-generating portion 83a can be composed of, for example, a NOR gate circuit, and the switching control portion 83b can be composed of, for example, an analog switch circuit.

The liquid crystal display device consisting of the above-mentioned composition of the present Example can be composed of the similar members as a conventional liquid crystal display device only by changing the electrical control of the transparent electrode layer 12 of the touch panel 1.

Further, although electrical field which is generated based on the voltage of the electrode signals applied to the counter electrode layer 23 of the liquid crystal panel 2 is periodical, the liquid crystal display device of the present Example can contradict electrical field caused by the voltage of the fore-mentioned common electrode signals, by applying the voltage which is changed in synchronization with the frequency of the change of the voltage of the common electrode signals to the rear face side electrode layer 13 of the touch panel 1. Accordingly, for example, even if the surface of the liquid crystal panel 2 and the rear face of the touch panel 1 are charged, the Coulomb force which liberates the charge charged can be suppressed; therefore the vibration of the liquid crystal panel 2 and the touch panel 1 can be suppressed and the phenomenon of the sound generation can be evaded.

Figure 5:
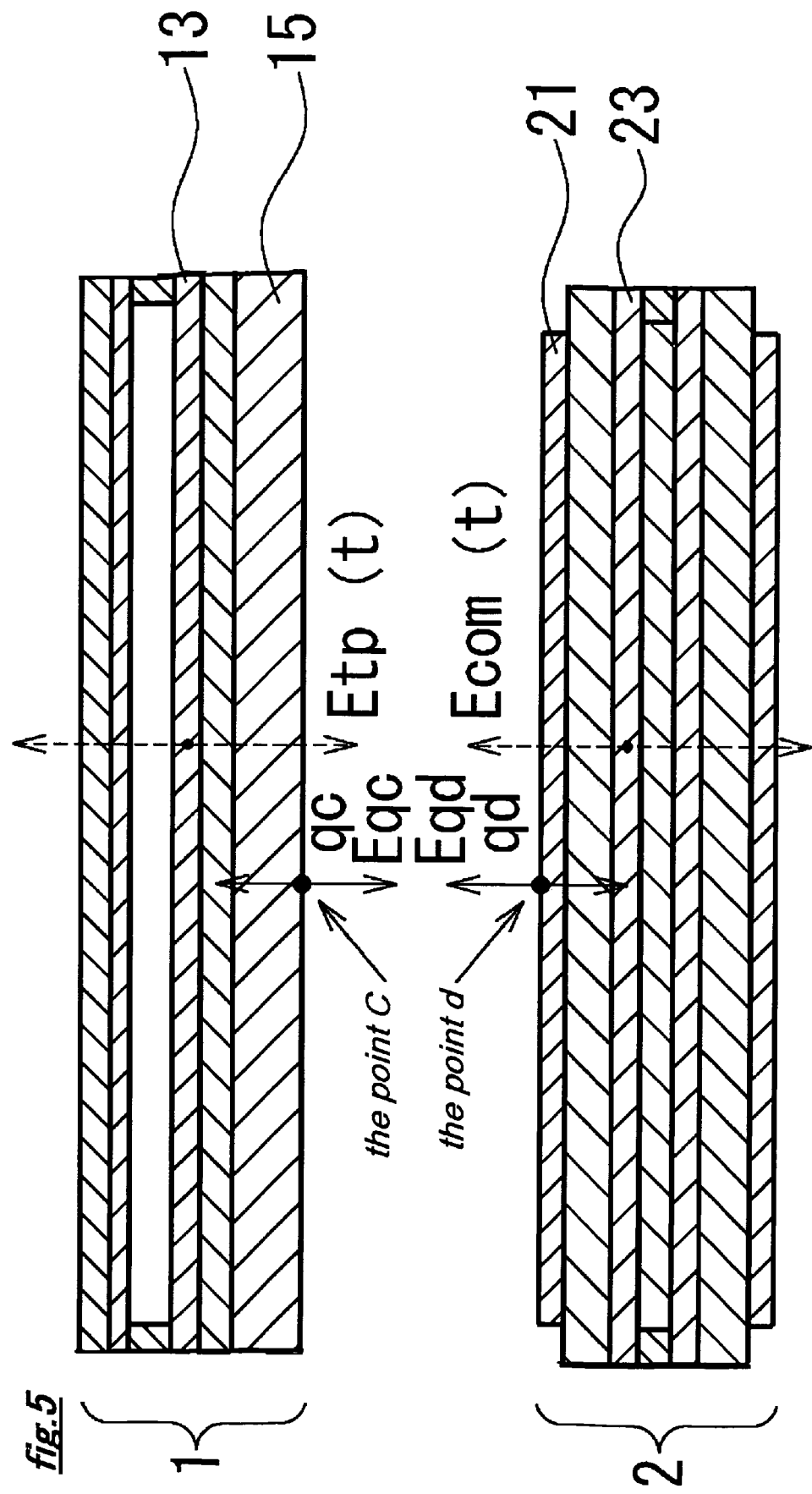
FIG. 5 shows a schematic sectional view of the liquid crystal display device of Example 1.
Figure 6:
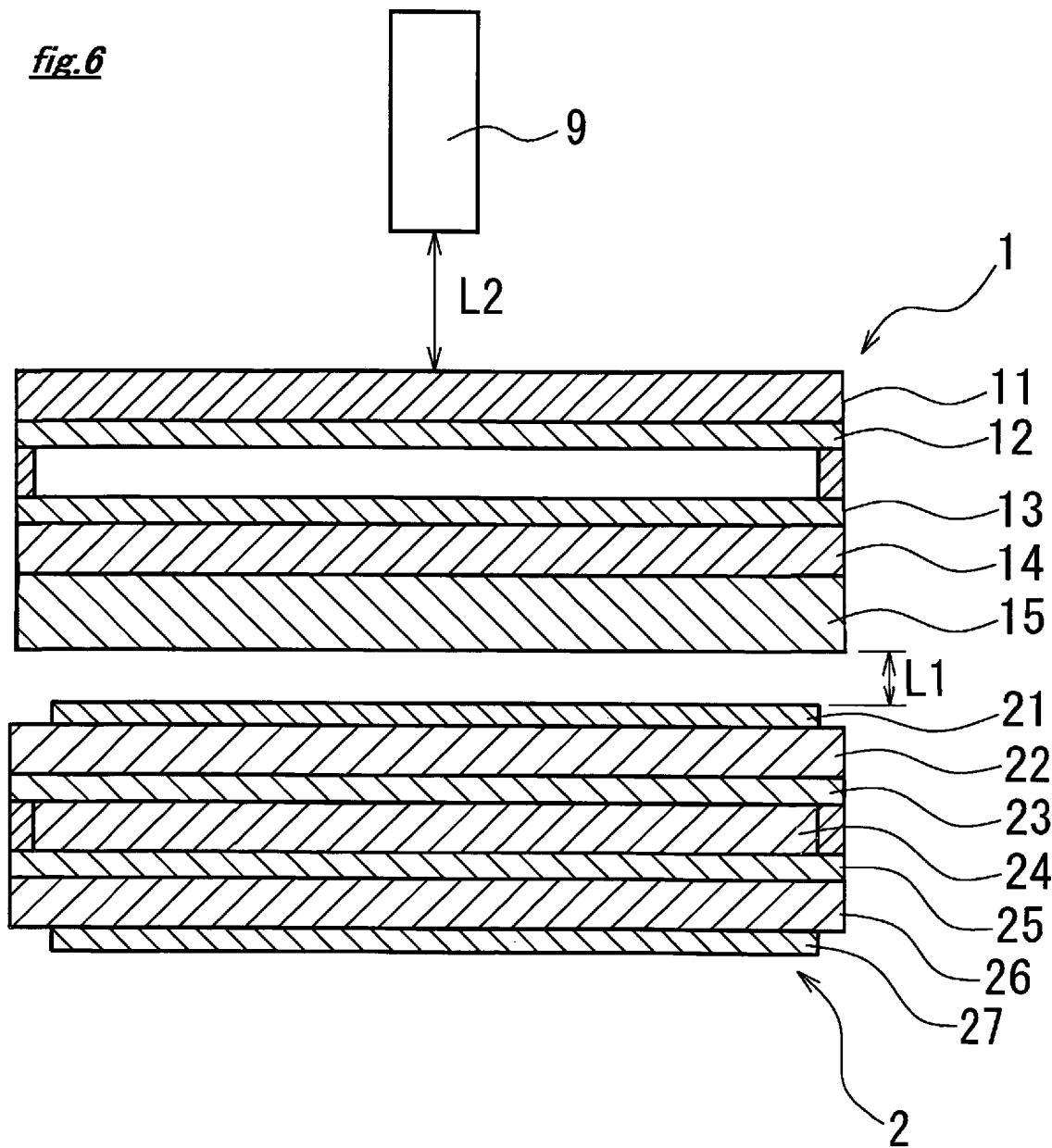
FIG. 6 shows an illustration view of the experimental example of the liquid crystal display device of the same Example.

Further, the theory of evading the phenomenon of the sound generation is specifically described below referring to FIG. 5. Firstly, the arbitrary point c of the rear face (of the transparent member 15) of the touch panel 1 and the point d of the surface (of the polarizing plate 21) of the liquid crystal panel 2 which faces it are marked. When charge charged on the point c is referred to as qc and charge charged on the point d is referred to as qd, respective forces Fc and Fd which are acted to qc and qd can be determined by the following formula. (Further, on illustration, only components to a lamination direction of the liquid crystal panel 2 with the touch panel 1 is considered as the components of the forces (and the components of electric field).)

$$Fc = qc \times Ec$$

$$Fd = qd \times Ed$$

Further, Ec is the electric field strength of the point c and Ed is the electric field strength of the point d.

Herein, the electric field strength Ec of the point c is determined by the following formula. (Further, the electric field strength has strictly an electric field component by the voltage of signals which are applied to the pixel electrodes or segment electrodes of a pair of electrode layers of the touch panel 1, but since they are not almost changed at a constant frequency which will be the cause of the sound generation, they are forcibly abbreviated hereat.)

$$Ec = Ecomc(t) + Eqc + Eqd - Etpd(t) \qquad \text{Formula (1)}$$

Further, Ecomc(t) is caused by the drive of the liquid crystal panel 2 (the counter electrode layer 23) among the electric field components at the point c and the function of time; Eqc is caused by the charge qc among the electric field components at the point c; Eqd is caused by the charge qd among the electric field components at the point c and Etpc(t) is caused by the voltage of the rear face side electrode layer 13 of the touch panel 1 among the electric field components at the point c.

Herein, when a voltage is not applied to the rear face side electrode layer 13 of the touch panel 1, Etpd becomes zero; therefore Ecomc(t) is changed at a drive frequency component by COM signals which is changed at a drive frequency in like manner as a conventional technique and Fc is also changed at the drive frequency. However, in Example 1, since a voltage which is synchronized with the change of voltage of the common electrode signals, the time change of Ec is reduced. Furthermore, the time change of the electric field strength Ec can be removed by deciding the level of signal amplitude (AC voltage value) which is applied to the rear face side electrode layer 13 of the touch panel 1 by the positional relation of the rear face of the touch panel 1, the counter electrode layer 23 and the rear face side electrode layer 13 of the touch panel 1. Further, this is also similarly considered for the force Fd which is acted to the charge of the point d.

Furthermore, since the similar change of the electric field strength is also generated at the other points of the rear face (of the transparent member 15) of the touch panel 1, the total charge quantity of the whole face of the rear face (of the transparent member 15) of the touch panel 1 is referred to as Qtp and it is considered that Qtp, namely, Ftp which is acted to the whole face is hardly changed similarly; therefore it is considered that F1c which is acted to the whole surface of the panel is also hardly changed similarly when the total charge quantity of the whole surface of the liquid crystal panel 2 is referred to as Q1c.

Thus, since the time changes of Ftp and F1c which are respectively liberated on the rear face of the touch panel 1 and the surface of the liquid crystal panel 2 can be lessened, the vibration of a space between the touch panel 1 and the liquid crystal panel 2 is removed and the phenomenon of the sound generation can be evaded.

EXAMPLES

Experiments below were carried out for the liquid crystal display device of the above-mentioned Example 1.

Firstly, the liquid crystal display device used for experiments having a screen size of 3 inches square and a pixel number of QVGA (240×320) was used and a voltage having a drive frequency of 9.5 kHz and an amplitude of 5 V was applied to a counter electrode layer for driving the liquid crystal.

Further, a gap L1 between the touch panel 1 and the liquid crystal panel 2 was set at 73 μm, the touch panel 1 having a thickness of a surface side sheet material of 175 μm and a thickness of a rear face side sheet material of 125 μm was used, and a plate material having a thickness of 250 μm which was made of a polycarbonate was used as the transparent member of the rear face.

Two liquid crystal display devices (sample A and sample B) described above were prepared. The phenomenon of the sound generation was respectively measured for the samples A and B when a voltage with a fixed frequency was applied to the rear face side electrode layer 13 of the sheet material on the rear face side of the touch panel 1 (Examples 1 and 2), and when the voltage was not applied (Comparative Examples 1 and 2). Furthermore, the voltage applied to the rear face side electrode layer 13 was an amplitude of 5 V and a frequency of 9.5 kHz in like manner as the drive voltage of the liquid crystal panel 2 in respective experimental examples, and synchronized with the fore-mentioned drive voltage. The measurement of the phenomenon of the sound generation was carried out by a sound pressure measurement device 9 (Product name: LA5111 manufactured by Ono Measurement Instrument Co.) which was set at a position of 10 mm upward from the central position of the touch panel 1.

As a result, the sound pressure measured in Comparative Example 1 was 41.06 dB and to the contrary, the sound pressure of the sample A measured in Example 1 was 7.07 dB. Further, the sound pressure measured in Comparative Example 2 was 43.01 dB and to the contrary, the sound pressure of the sample B measured in Example 2 was 15.77 dB.

Example 2

Figure 7:
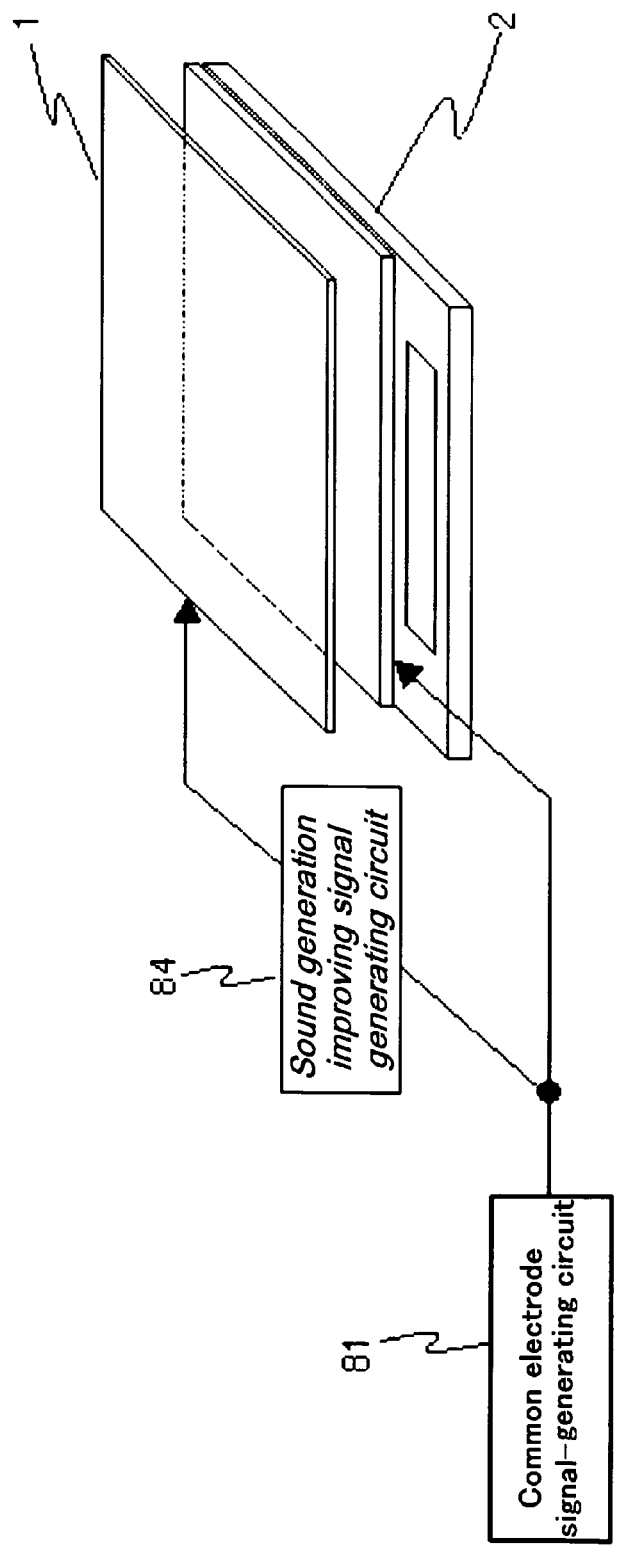
FIG. 7 is a schematic cross-eyed view for schematically illustrating the liquid crystal display device of Example 2.
Figure 8:
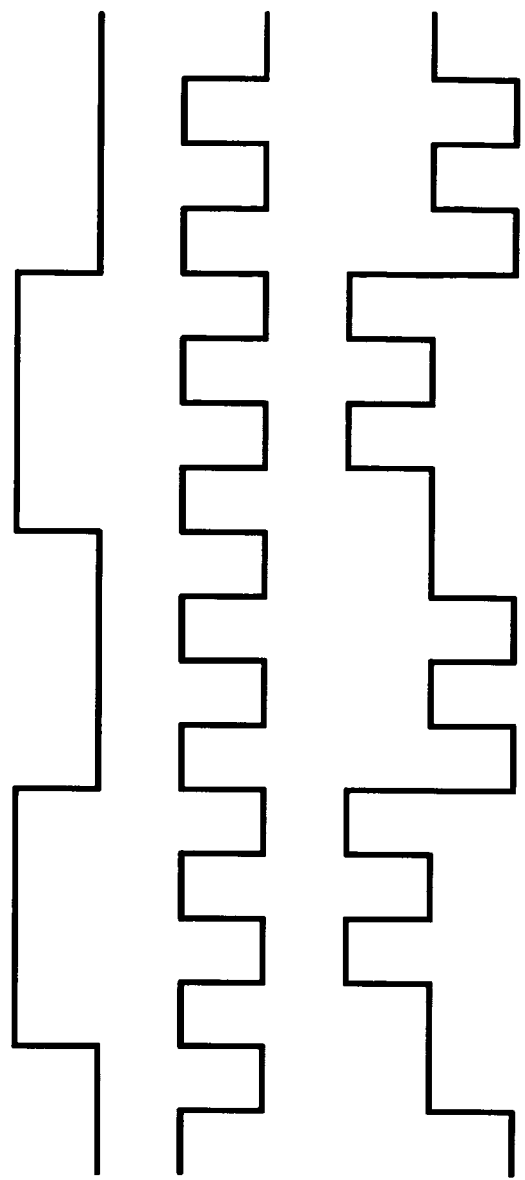
FIG. 8 is a schematic illustration diagram for illustrating relation between voltages applied to respective electrode layers and electrical field at a tabular member in the liquid crystal display device of Example 2, (a) shows relation between the voltage (longitudinal axis) applied to the counter electrode layer (common electrode layer) of the liquid crystal panel and a time (horizontal axis), (b) shows relation between the voltage (longitudinal axis) applied to the rear face side electrode layer of the touch panel and a time (horizontal axis), and (c) shows relation between the electric field (longitudinal axis) in the tabular member and a time (horizontal axis).

Then, Example 2 of the present invention is illustrated below referring to FIGS. 7 and 8, but the illustration of a portion which is composed of the similar composition as Example 1 is abbreviated.

The structure of the touch panel 1 and the liquid crystal panel 2 in the liquid crystal display device of Example 2 is the same as that of Example 1 and its illustration is abbreviated. The liquid crystal display device of Example 2 is different from that of Example 1 and equipped with a sound generation improving signal-generating circuit 84 which carries out a-fixedprocessingtoavoltagewhichthefore-mentionedcommonelectrode signal-generating circuit 81 generated, preparing sound generation improving signals and applying said sound generation improving signals to the fore-mentioned rear face side electrode layer 13.

Example 2 is equipped with the switch means 83 which switches electrical connection between the transparent electrode layers 12 and 13 of the touch panel 1 and the fore-mentioned touch panel controller 82 to the conducted condition and to the intercepted condition in like manner as Example 1, but in Example 2, said switch means 83 is provided so as to switch electrical connection between the transparent electrode layers 12 and 13 of the touch panel 1 and the sound generation improving signal-generating circuit to the conducted condition and to the intercepted condition.

Herein, the sound generation improving signal-generating circuit 84 prepares the sound generation improving signals by which a voltage is changed at frequency of integer-fold (for example, 4-fold) of the frequency of the common electrode signals and applies the sound generation improving signals to the rear face side electrode layer 13 of the touch panel 1. Thereby, since the change of the electric field strength at the rear face of the touch panel 1 and the surface of the liquid crystal panel 2 is not the change of a constant frequency, the phenomenon of the sound generation can be evaded. Namely, for example, when a voltage of 40 kHz is applied to the rear face side electrode layer in a case that a voltage with a frequency of 10 kHz is applied to the counter electrode layer 23, the change of a constant frequency does not occur at the electric field at the transparent member 15 as shown in FIG. 8(c). Further, although it is considered that the change of the electric field within a slightly short time contributes to vibration to a tubular member, the vibration by the electric field becomes out of audible range (40 kHz); therefore it is not recognized by a person.

Example 3

Figure 9:
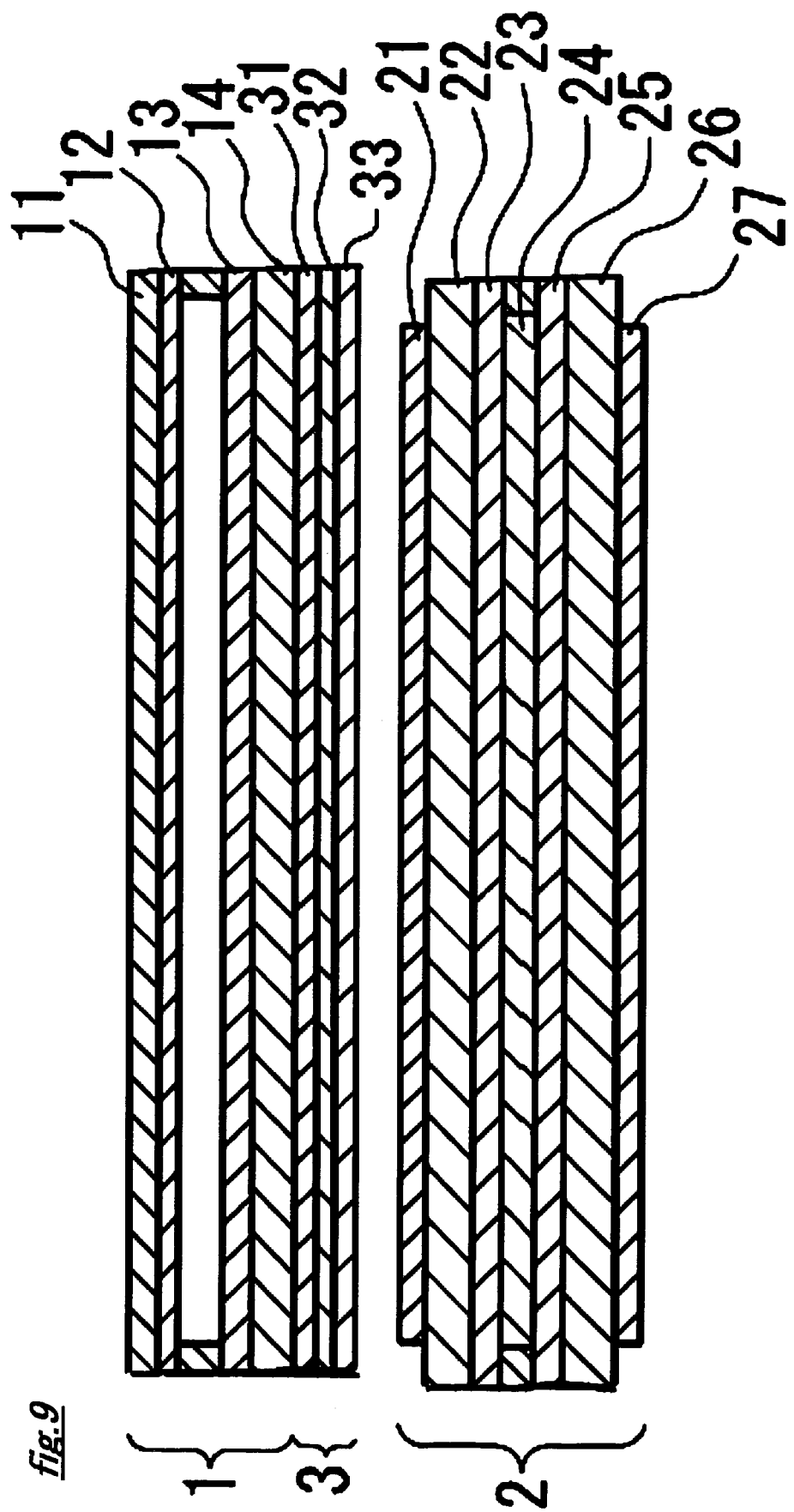
FIG. 9 shows a schematic sectional view of the liquid crystal display device of Example 3.

Then, Example 3 of the present invention is illustrated below referring to FIG. 9, but the illustration of a portion which is composed of the similar composition as Example 1 is abbreviated.

The liquid crystal display device of Example 3 is composed by that the touch panel 1 is arranged on the surface of the conventionally known liquid crystal panel 2 at a fixed gap in like manner as Example 1.

The liquid crystal display device of Example 3 arranges a transparent electrode sheet 3 between the liquid crystal panel 2 and the touch panel 1 and specifically, the fore-mentioned transparent electrode sheet 3 is bonded on the rear face side of the touch panel 1. The transparent electrode sheet 3 has a transparent electrode layer 32. Specifically, the transparent electrode layer 32 is formed by lamination on the surface side of the transparent film 32 made of a resin, an adhesive layer 31 is formed by lamination on the surface side of said transparent electrode layer 32, and it is bonded on the rear face of the touch panel 1 by the adhesive layer 31.

Further, a voltage which is changed at the same phase and the same frequency as the change of the voltage of the common electrode signals of the liquid crystal panel 2 is applied to the transparent electrode layer 32 of the transparent electrode sheet 3. In Example 3, the switch means 83 in Example 1 is not provided and in Example 3, the fore-mentioned voltage is normally applied to the fore-mentioned transparent electrode layer 32 at driving the liquid crystal.

The above-mentioned liquid crystal display device of Example 3 has a similar advantage as Examples 1 and 2 and can control the electrode layer of the touch panel 1 and the electrode layer of the liquid crystal panel 2 by a similar control method as a conventional device.

Further, in Example 3, it is also an item which can be appropriately changed in design that the fore-mentioned transparent electrode sheet 3 is arranged on the surface (for example, the surface of the polarizing plate 21 on the surface side, or between the surface side substrate 22 of the liquid crystal panel 2 and the polarizing plate 21) of the liquid crystal panel 2. Furthermore, it is also an item which can be appropriately changed in design that an electrode layer applying a desired voltage is directly formed on the surface of the liquid crystal panel 2 or the rear face of the touch panel 1 without depending on the above-mentioned transparent electrode sheet 3.

Example 4

Figure 10:
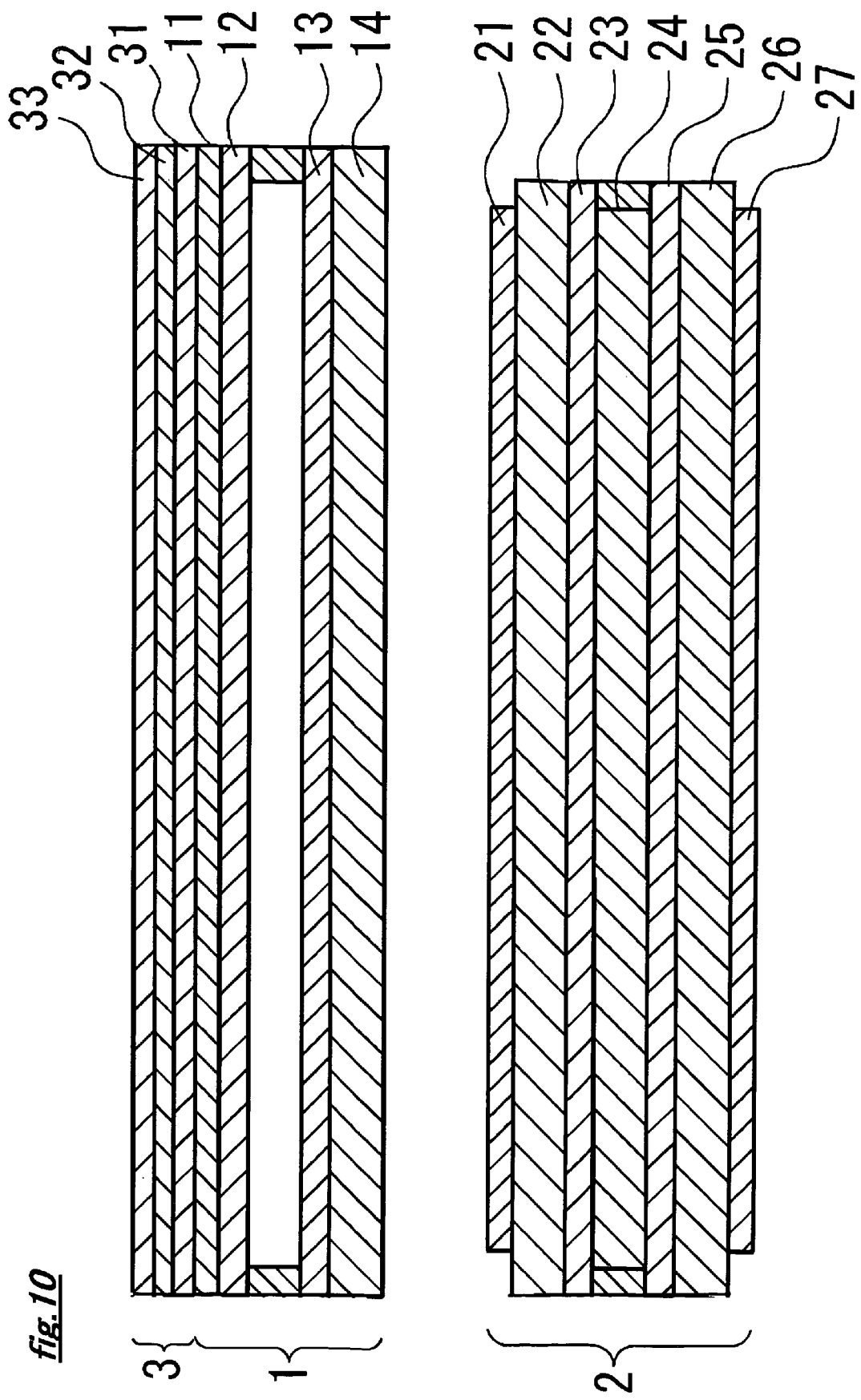
FIG. 10 shows a schematic sectional view of the liquid crystal display device of Example 4.

Then, Example 4 of the present invention is illustrated below referring to FIG. 10, but the illustration of a portion which is composed of the similar composition as Example 1 is abbreviated.

The liquid crystal display device of Example 4 is composed by that the touch panel 1 is arranged on the surface of the conventionally known liquid crystal panel 2 at a fixed gap in like manner as Example 1. The liquid crystal display device of Example 4 arranges a transparent electrode sheet 3 such as Example 3 on the surface of the touch panel 1, a voltage which is changed at the same phase and the same frequency as the change of the voltage of the common electrode signals which is applied to the counter electrode layer 23 of the liquid crystal panel 2 is applied to the transparent electrode layer 32 of the transparent electrode sheet 3.

Further, in the example illustrated, there is illustrated an article which is obtained by bonding the transparent electrode sheet 3 having the transparent electrode layer 32 to which a desired voltage is applied on the surface of the touch panel 1 through the adhesive layer 31, but said transparent electrode layer 32 can be directly laminated on the surface (of the surface side sheet material 11). Further, it is also an item which can be appropriately changed in design that the fore-mentioned transparent electrode layer 32 is arranged on the liquid crystal panel 2 side.

Example 5

Figure 11:
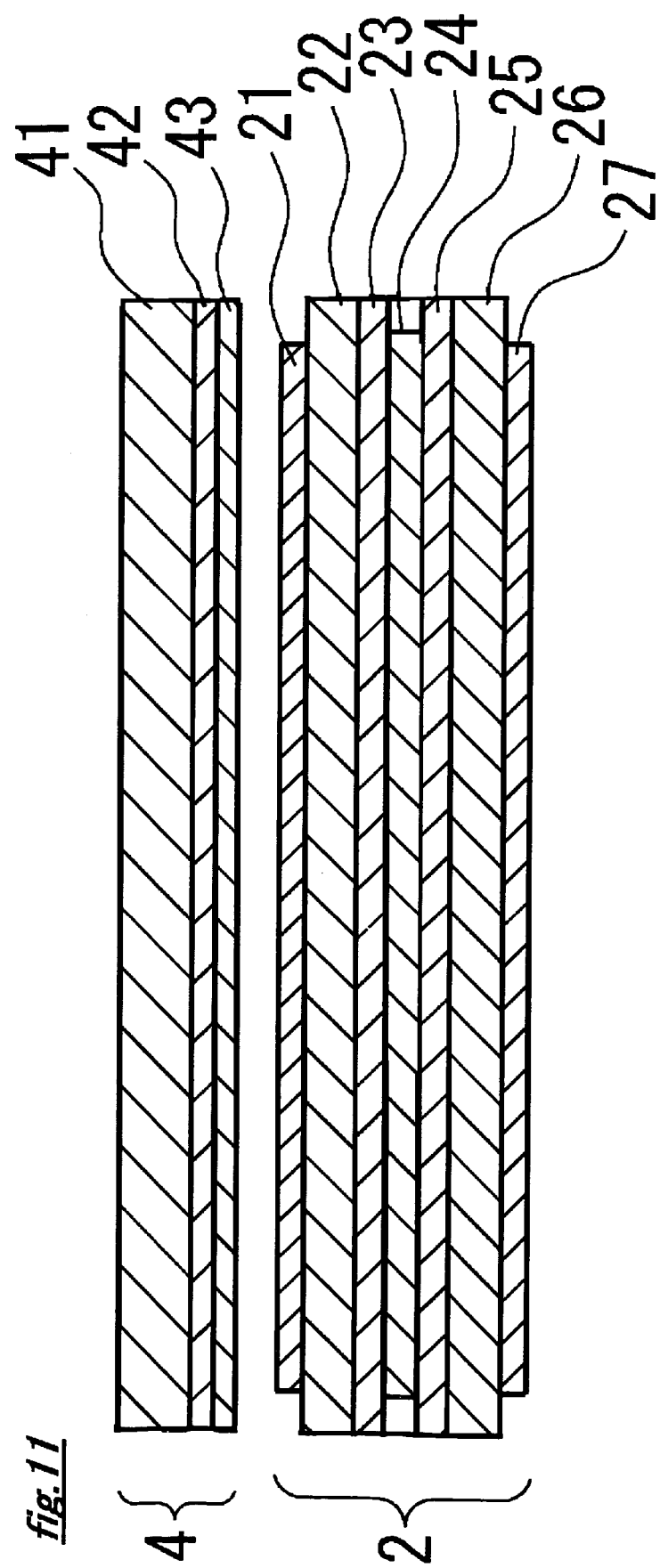
FIG. 11 shows a schematic sectional view of the liquid crystal display device of Example 5.
Figure 12:
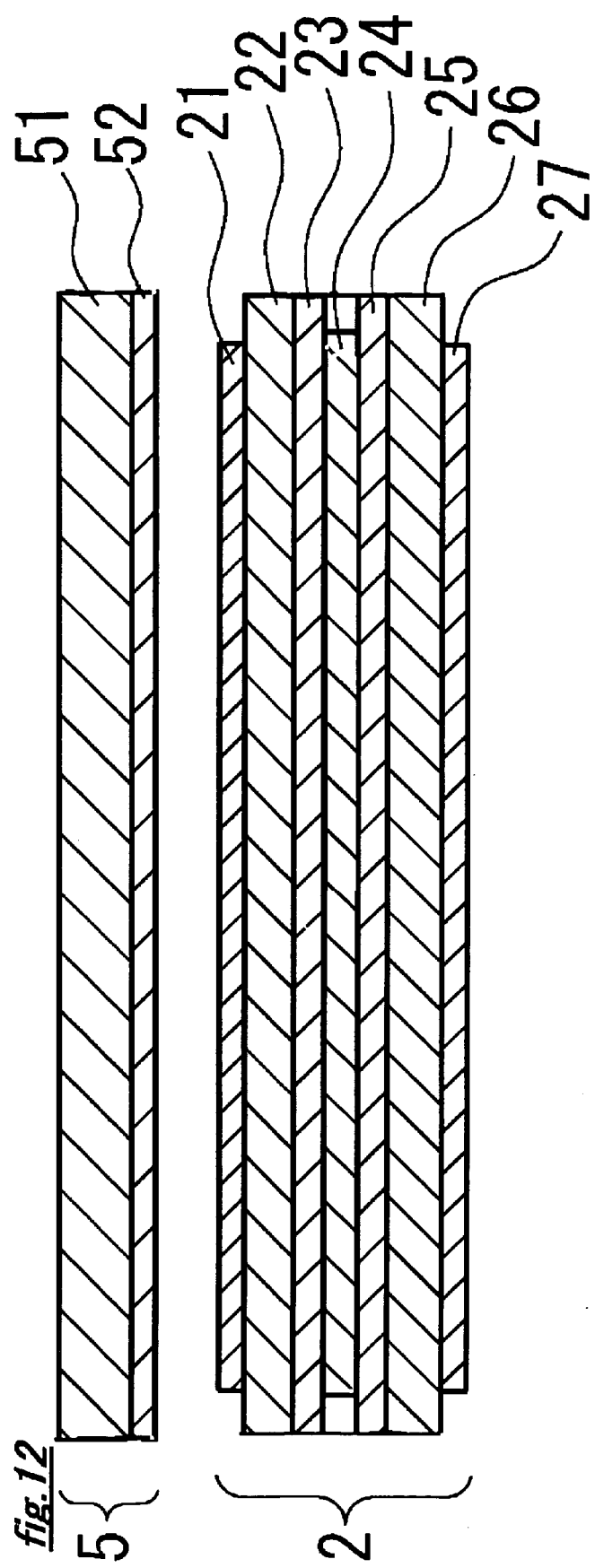
FIG. 12 shows a schematic sectional view of the liquid crystal display device of Example 6.
Figure 13:
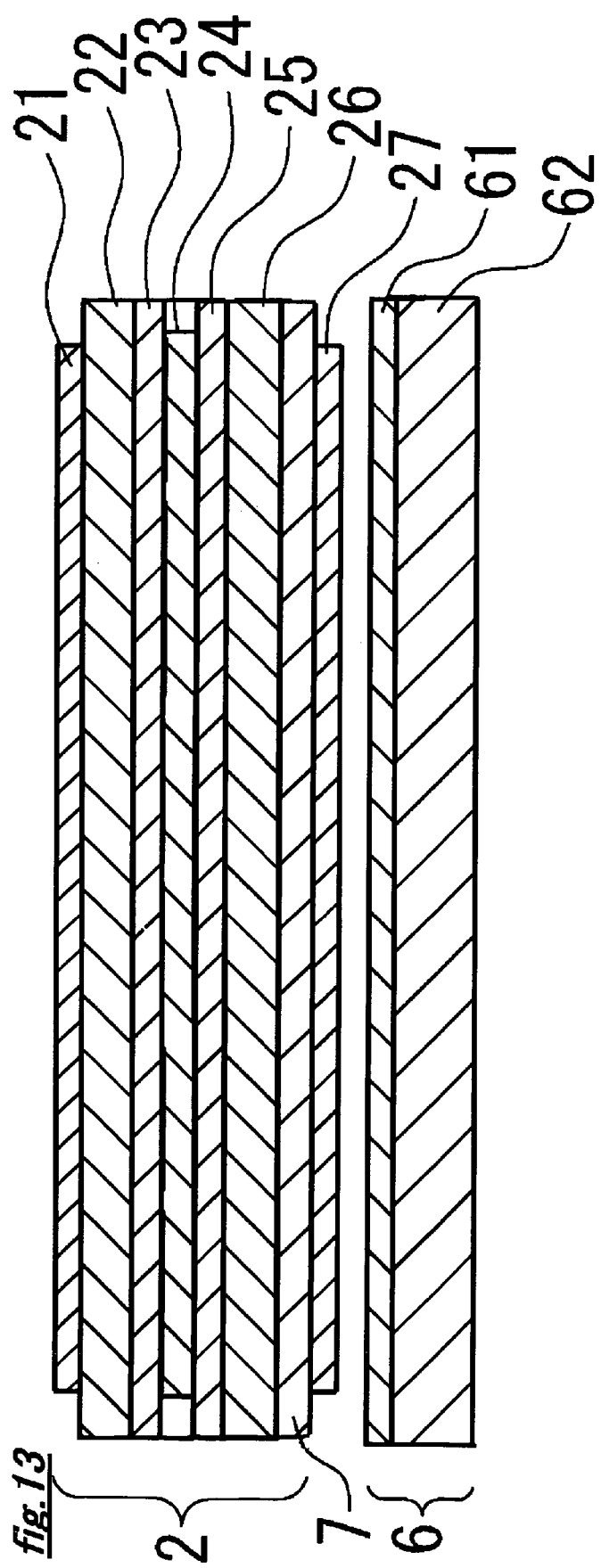
FIG. 13 shows a schematic sectional view of the liquid crystal display device of Example 7.
Figure 14:
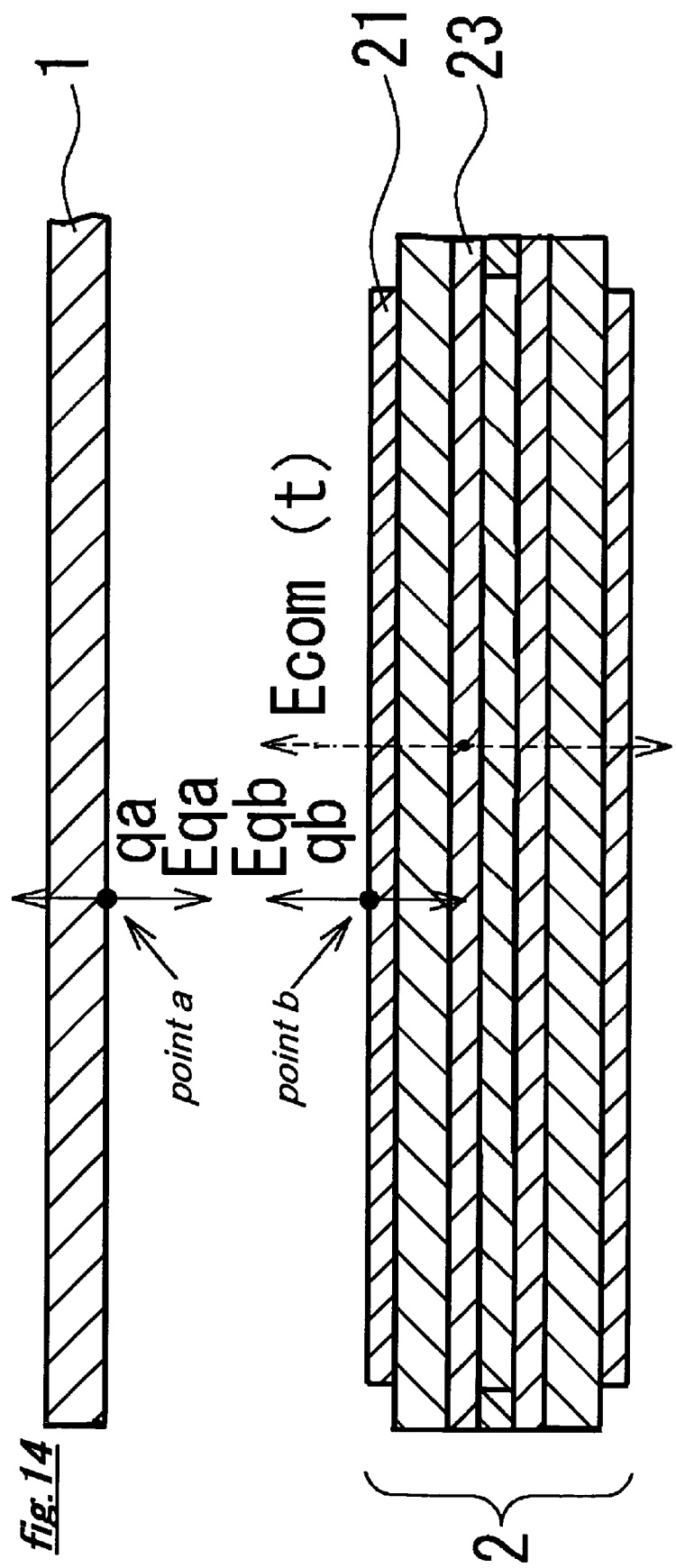
FIG. 14 shows a schematic sectional view of a liquid crystal display device

Then, Example 5 of the present invention is illustrated below referring to FIG. 11, but the illustration of a portion which is composed of the similar composition as Example 1 is abbreviated.

The liquid crystal display device of Example 5 is composed by that a transparent protective plate 4 (surface panel) for protecting said liquid crystal panel 2 is arranged on the surface of the conventionally known liquid crystal panel 2 at a fixed gap.

The liquid crystal display device of Example 5 is composed by that the transparent protective plate 4 is laminated on a transparent electrode layer 42 at the rear face of the main body 41 of the protective plate and a transparent resin film 43 is laminated at the rear face of the transparent electrode layer 42. A voltage which is changed at the same phase and the same frequency as the change of the voltage of the common electrode signals which is applied to the counter electrode layer 23 is applied to the transparent electrode layer 42 of the protective plate 4.

Thereby, the phenomenon of the sound generation which has been generated at a gap between the protective plate 4 and the liquid crystal panel 2 can be surely evaded.

Further, in the example illustrated, an article which forms the transparent electrode layer 42 which applies a desired voltage to the protective plate 4 was illustrated, but it is also an item which can be appropriately changed in design that the transparent electrode layer 3 having the transparent electrode layer such as Example 3 is bonded with the protective plate 4. It is also an item which can be appropriately changed in design that the electrode layer which applies a desired voltage for improving the sound generation is provided for the liquid crystal panel 2 without providing the electrode layer on the protective plate also in the case of having the protective plate such as Example 5.

Example 6

Then, Example 6 of the present invention is illustrated below referring to the diagram, but the illustration of a portion which is composed of the similar composition as Example 1 is abbreviated.

The liquid crystal display device of Example 6 is composed by that the light conductive plate 51 of the front light unit 5 is arranged on the surface of the conventionally known liquid crystal panel 2 at a fixed gap.

In the liquid crystal display device of Example 6, a transparent electrode layer 52 is formed by lamination on the light conductive plate 51 of the front light unit 5 and a voltage which is changed at the same phase and the same frequency as the change of the voltage of the common electrode signals which is applied to the counter electrode layer 23 is applied to the transparent electrode layer 52 in like manner as Examples described above.

Thereby, the phenomenon of the sound generation which has been generated at a gap between the front light unit 5 and the liquid crystal panel 2 can be surely evaded.

Further, in the example illustrated, an article which forms the transparent electrode layer 52 which applies a desired voltage for improving the sound generation to the light conductive plate 51 of the front light unit 5 was illustrated, but, for example, it is also an item which can be appropriately changed in design that the transparent electrode layer 3 having the transparent electrode layer such as Example 3 is bonded with the light conductive plate 51. It is also an item which can be appropriately changed in design that the electrode layer which applies a desired voltage for improving the sound generation is provided for the liquid crystal panel 2 without providing the electrode layer on the light conductive plate of the front light unit also in the case of having the front light unit such as Example 6.

Example 7

Then, Example 7 of the present invention is illustrated below referring to the diagram, but the illustration of a portion which is composed of the similar composition as Example 1 is abbreviated.

In the liquid crystal display device of Example 7, an optical sheet 61 composing the back light unit 6 is arranged on the rear face of the conventionally known liquid crystal panel 2 at a fixed gap and the liquid crystal panel 2 is equipped with a transparent electrode layer 7 to which a desired voltage for improving the sound generation which is generated between said liquid crystal panel 2 and the optical sheet 61 of the back light unit 6 is applied.

The back light unit 6 of the liquid crystal display device of Example 7 is equipped with a light conductive plate 62 and the optical sheet 61 which was laminated on said light conductive plate 62. Further, the fore-mentioned transparent electrode layer 7 is provided on the liquid crystal panel 2 and the transparent electrode layer 7 is arranged between a substrate 26 of the rear face side (an opposite side of the display face) of the liquid crystal panel 2 and a polarized plate 27. Specifically, the fore-mentioned transparent electrode layer 7 is formed by lamination on the rear face of the rear face side substrate 26 of the liquid crystal panel 2 and the polarized plate 27 is bonded at the rear face of said transparent electrode layer 7.

Further, in Example 7, a voltage which is changed at the reverse phase and the same frequency as the change of the voltage of the fore-mentioned common electrode signals is applied to the transparent electrode layer 7. Namely, when there are arranged both of the transparent electrode layer 7 to which a desired voltage for improving the sound generation is applied and the fore-mentioned counter electrode layer 23 are arranged at the one side (the surface side (the display face side) in Example 7) of members (the polarized plate 27 and the optical sheet 61) which are situated between a gap causing the sound generation, a voltage with a reverse phase against the change of the voltage which is applied to the fore-mentioned counter electrode layer is preferably applied to the transparent electrode layer 7, as Example 7.

According to the liquid crystal display device of Example 7, the phenomenon of the sound generation which has been generated at a gap between the back light unit 6 and the liquid crystal panel 2 can be surely evaded.

Further, in the above-mentioned Example 7, the transparent electrode layer to which a desired voltage is applied can be also composed by the transparent electrode sheet 3 such as Example 3 and it is also an item which can be appropriately changed in design that it is provided on members composing the back light unit 6 without providing the electrode layer for the liquid crystal panel 2.

Further, in the above-mentioned respective Examples, there have been illustrated a device in which a voltage in synchronization with liquid crystal drive at the same phase such as Example 1 is applied to the electrode layer so that the voltage is applied so as to generate electrical field which changes the cycle of the periodical electrical field generated based on the common electrode; a device such as Example 2 which was provided so that a voltage with an integer-fold of frequency against the frequency for driving the liquid crystal is applied and vibration of the liquid crystal panel and the like is out of an audible zone; and a device such as Example 7 in which a voltage with a reverse phase against the frequency for driving the liquid crystal is applied; but the present application is not always limited to these methods.

Further, in the above-mentioned Example 1, the desired voltage for suppressing the sound generation which is applied to the electrode layer was set as a voltage having the same voltage level as the common electrode signals, but as the desired voltage for suppressing the sound generation, a voltage having a voltage level different from the common electrode signals can be applied. Further, in this case, it is preferable that the sound generation improving signal-generating circuit described later is further provided.

What is claimed is:

1. A display device, comprising:
   a panel having a common electrode layer to which a voltage changing at a fixed frequency is applied;
   a tabular member which is arranged at a fixed gap from said panel; and
   an electrode layer which is arranged so as to be in nearly parallel to said tabular member and said panel is provided;
   wherein a voltage generating electric field which changes the cycle of changing the electric field which is generated by applying a voltage changing at a fixed frequency to said common electrode layer is applied to said electrode layer,
   further comprising:
   a common electrode signal-generating circuit for generating a voltage applied to said common electrode layer; and
   a sound generation improving signal-generating circuit which carries out a fixed processing to a voltage which said common electrode signal-generating circuit generated, preparing sound generation improving signals and applying these sound generation improving signals to said electrode layer.

2. A display device according to claim 1,
   wherein said tabular member is arranged at a fixed gap from said panel above the display face side of this panel.

3. A display device according to claim 1,
   wherein said electrode layer is provided at the panel having said common electrode layer.

4. A display device, comprising:
   a panel having a common electrode layer to which a voltage changing at a fixed frequency is applied;
   a tabular member which is arranged at a fixed gap from said panel,
   an electrode layer which is arranged so as to be in nearly parallel to said tabular member and said panel is provided,
   and a voltage which is changed in synchronization with the change of a voltage which is applied to said common electrode layer is applied to said electrode layer,
   wherein said tabular member is arranged at a fixed gap from said panel above the display face side of this panel, and
   wherein said tabular member is one portion of members composing a front light which is arranged above the display face side of said panel and said electrode layer is a transparent electrode layer which was arranged at said front light.

5. A display device, comprising:
   a panel having a common electrode layer to which a voltage changing at a fixed frequency is applied;
   a tabular member which is arranged at a fixed gap from said panel;
   an electrode layer which is arranged so as to be in nearly parallel to said tabular member and said panel is provided,
   and a voltage which is changed in synchronization with the change of a voltage which is applied to said common electrode layer is applied to said electrode layer;
   wherein said electrode layer is provided at the panel having said common electrode layer
   further comprising a backlight which is arranged above the opposite side of the display face of said panel and supplies light to this panel,
   wherein said tabular member is one portion of a member composing this backlight,
   and said electrode layer is the transparent electrode layer which is provided on the opposite side of the display face of said panel.

6. A display device according to claim 5,
   wherein said panel comprising a first transparent substrate and a second transparent substrate which is arranged above the display face side than said first transparent substrate,
   the said transparent electrode layer is formed on the opposite side of the display face of said first transparent substrate,
   and a polarizing plate is bonded on the opposite side of the display face of said transparent electrode layer.

* * * * *